Jan. 13, 1970   J. A. CORL ET AL   3,489,981
ELECTRICAL DISTRIBUTION SYSTEM
Filed Jan. 6, 1967   3 Sheets-Sheet 1
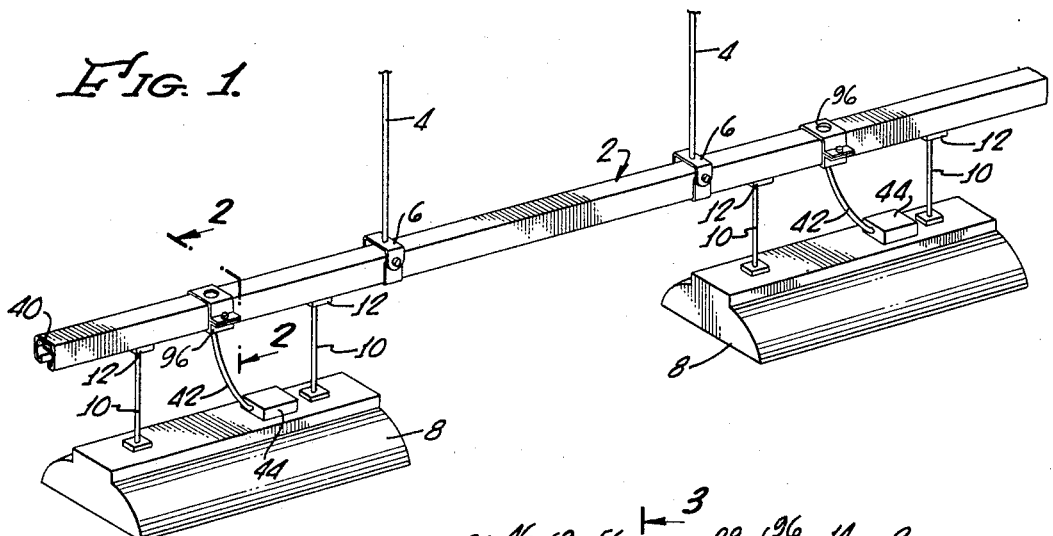
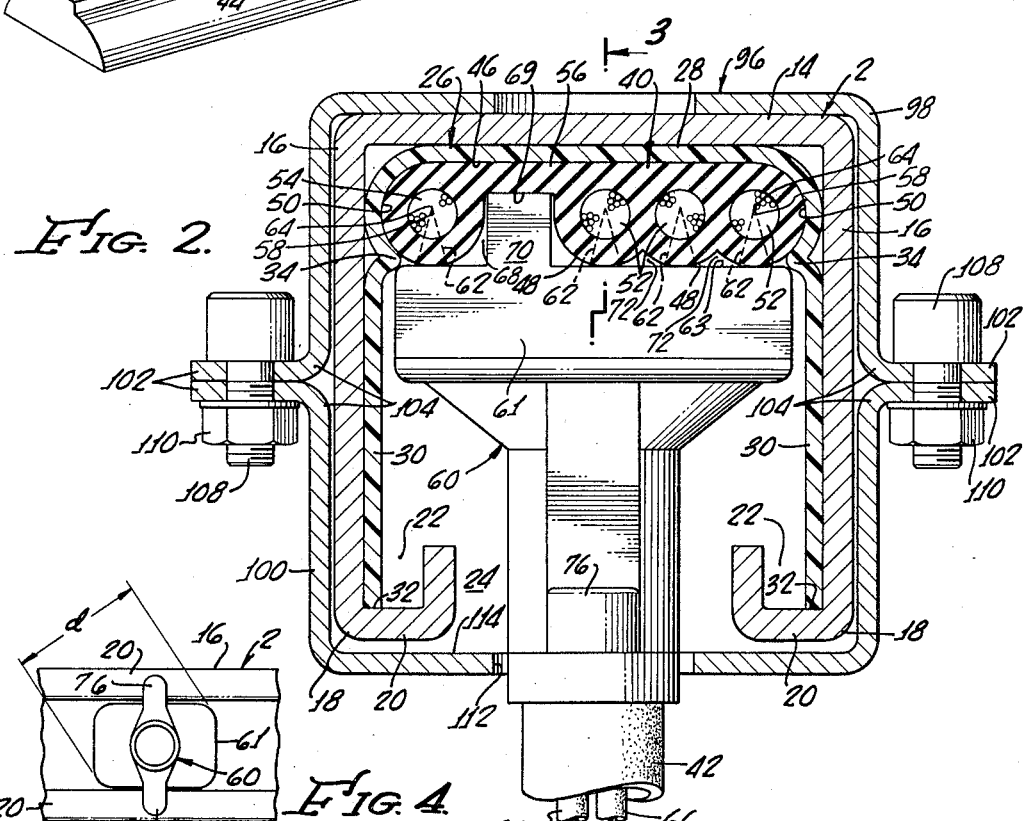
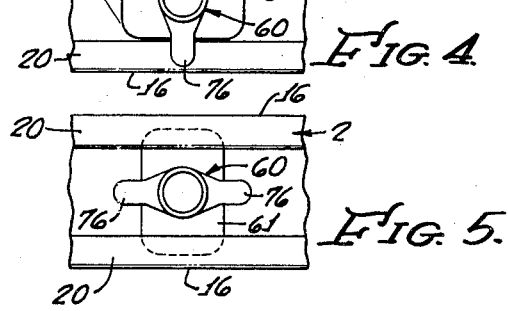
INVENTORS.
JAMES A. CORL
RONALD J. KILBURG
BY FOWLER, KNOBBE
& MARTENS
ATTORNEYS.

Jan. 13, 1970    J. A. CORL ET AL    3,489,981
ELECTRICAL DISTRIBUTION SYSTEM
Filed Jan. 6, 1967    3 Sheets-Sheet 2

INVENTORS.
JAMES A. CORL
RONALD J. KILBURG
BY
FOWLER, KNOBBE
& MARTENS
ATTORNEYS.

Jan. 13, 1970  J. A. CORL ET AL  3,489,981
ELECTRICAL DISTRIBUTION SYSTEM
Filed Jan. 6, 1967  3 Sheets-Sheet 3

INVENTORS.
JAMES A. CORL
RONALD J. KILBURG
BY
FOWLER, KNOBBE
& MARTENS
ATTORNEYS.

United States Patent Office

3,489,981
Patented Jan. 13, 1970

3,489,981
ELECTRICAL DISTRIBUTION SYSTEM
James A. Corl and Ronald J. Kilburg, San Carlos, Calif., Assignors to Insul-8-Corp., San Carlos, Calif., a corporation of California
Continuation-in-part of application Ser. No. 580,333, Sept. 19, 1966. This application Jan. 6, 1967, Ser. No. 607,846
Int. Cl. H01r 9/00, 11/20, 13/50
U.S. Cl. 339—21
9 Claims

ABSTRACT OF THE DISCLOSURE

An elongate electrical cable and webs of insulating material are inserted into a plurality of structural channels joined end-to-end and suspended overhead. The insulated webs extend downward from the cable along opposite sides of the channel and rest on the channel lips to support the cable against the base of the channel and shield the metal channel side walls from the cable conductors.

CROSS REFERENCE TO RELATED APPLICATIONS

This application is a continuation-in-part of applicants' co-pending U.S. patent application Ser. No. 580,333, filed Sept. 19, 1966, and now abandoned, and is an improvement to the invention disclosed and claimed in co-pending U. S. patent application Ser. No. 486,434, filed Sept. 10, 1965, now Patent No. 3,391,377.

BACKGROUND OF THE INVENTION

This invention relates to electrical distribution systems in which electrical cable is housed in structural channels which are, for example, suspended overhead in long spans.

In many factories, shops, offices and other buildings, it is common to suspend structural channels over the work area to use as a conduit for electrical cable, and often as a support for electrical fixtures. For example, such a system is often used where it is desirable to change the lighting arrangement and location of electrical equipment frequently to adapt to needed changes in the use of the space. If extension cords are used to accomplish the changes, an unsightly appearance is created, not to mention a safety hazard as well. On the other hand, the expense of relocating the power outlets in conventionally wired installations has been prohibitive.

Co-pending U.S. patent application Ser. No. 486,434, filed Sept. 10, 1965, discloses a system which provides great flexibility of fixture and outlet locations at a low initial installation cost, and permits relocation of the fixtures and outlets quickly without disconnecting the power supply to the distribution system.

In the system disclosed in that patent application, an insulated conductor cable is mounted within a conventional generally U-shaped fixture-supporting channel. The cable is formed so that it can be inserted into the channel raceway in long lengths after the channel has been installed, thereby eliminating the inconvenience and expense of modular length ducts which have special joints for simultaneously making mechanical and electrical connections. Moreover, the channels and conductors can be independently sized for the particular structural and electrical load requirements encountered. Power plugs having prongs which pierce the insulation of the electric cable are adapted to be conveniently and securely connected to the conductors at any location along their lengths to tap power from the conductor.

With such a system, however, difficulties can be encountered in satisfying the requirements of some electrical codes with respect to surface leakage distance and air leakage distance between the conductors and the metal channel, e.g., the Underwriter's Laboratory Code requires at least ⅜ of an inch through air and ½ inch oversurface for 600 volts. Of course, one solution would be to increase the channel size so that the conductors could be spaced further from the channel walls, but that generally is not practical because of the added cost of larger channels, and because it is often desired to install the distribution system in an existing channel installation.

SUMMARY OF THE INVENTION

This invention is directed to increasing the voltage leakage distance without increasing the size of the channel so that the code specifications can be satisfied within the confines of the small structural channel generally used in such systems. This is accomplished by use of a thin sheet or web of electrical insulating material which extends along each interior side wall of the channel from the edge of the cable to the lip of the channel so that each channel wall is shielded from the conductors of the electrical cable. The webs, like the cable, can be readily inserted into the channel in a continuous length for long runs after the channel members have been installed overhead.

Broadly, the invention comprises the combination of an elongate channel member, an elongate body of insulating material removably inserted interior of the metal channel member, a pair of webs of insulating material removably inserted interior of the channel and covering the channel interior side walls, and a plurality of elongate conductors held in spaced relationship by the insulating material. The channel member is a standard shape having a base and opposite sides which terminate in inturned lips to define an open longitudinal slot opposite the base. The lower edge of each of the webs abuts one of the lips of the metal channel to retain the body of insulating material with its upper face abutting the base of the metal channel and its lower face extending across and spaced above the channel slot.

The surface and air current leakage paths are effectively increased by the webs since the lip along the lower or front edge of the channel is the closest part of the metal channel exposed to the conductor wires or to the prongs of a plug in contact with the conductor wires. The lower face of the cable is spaced above the inturned lips to accommodate the power plug and to maintain the required minimum air leakage distance between the exposed metal lips and the conductor wires and prongs.

In one embodiment of the invention, the webs are portions of a thin elongate channel-shaped sheath of electrical insulating material which is separable from the electrical cable and inserted interior of the metal channel before insertion of the cable. The sheath has means for retaining the electrical cable against the base of the sheath. Since the insulating sheath is thin and closely conforms to the interior walls of the metal channel, it does not substantially reduce the size of the raceway interior of the channel. Moreover, the thin insulating sheath is relatively inexpensive and, because it is separable from the channel, it is easy to install in standard channels on the jobsite.

In another embodiment of this invention, the webs are integral with the cable and extend outwardly therefrom in diverging relationship when outside the channel. The webs can thus be extruded with the cable and, because the webs extend outwardly, the cable can still be coiled thus affording economies in both manufacture and storage. The insulating material is resilient so that it can be readily deformed to insert the cable and webs together through the longitudinal slot of the channel. Because of the outward bias of the webs, they contact the interior sidewall of the channel tightly when interior of the channel.

These and other features and objects of this invention will be apparent from the following detailed description when read with reference to the accompanying drawings.

BRIEF DESCRIPTION OF THE DRAWINGS

FIG. 1 is a perspective view of an electrical distribution system constructed in accordance with this invention;

FIG. 2 is a cross-sectional view taken generally along lines 2—2 of FIG. 1 and showing details of the metal channel, the sheath, the electrical cables, the plug, and the clamp;

FIGS. 4 and 5 are bottom plan views of the channel showing the plug in position for insertion through the longitudinal slot and in position for piercing the conductors, respectively;

DESCRIPTION OF THE PREFERRED EMBODIMENTS

Figure 3:
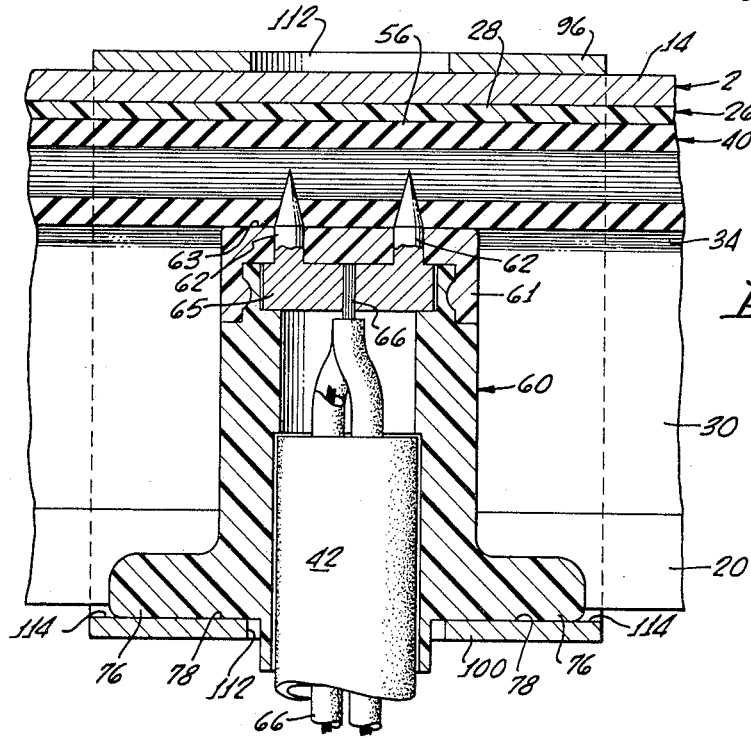
FIG. 3 is a partial section taken generally along lines 3—3 of FIG. 2 showing further details of the plug and its cooperation with the other elements of the electrical distribution system.

Referring to FIGS. 1 and 2, a plurality of structural steel channels 2 which are joined end-to-end to form a long straight horizontal run over a room area are suspended from the overhead structure of a building by hanger rods 4 and hanger brackets 6. Electrical fixtures such as fluorescent lights 8 are supported from the structural channel 2 by fixture hanger rods 10 and brackets 12 which may be connected to the channel at any selected location along its length. The channel 2 is formed in the shape of a U with a flat base 14 and two perpendicular flat side 16. In the illustrative embodiment, it is installed in an inverted position with its opening facing down.

At the lower edge 18 of each of the channel sides 16, a lip 20 extends inwardly and upwardly to form a U-shape defining an elongate interior gutter 22 in which the fixture supporting brackets 12 are connected. The two inwardly extending lips define an elongate slot 24 providing access to the interior of the channel. Such U-shaped channels are well-known in the art and are available commercially, e.g. from Unistrut Corportion, Wayne, Michigan. These channels form a part of this invention only to the extent that they are one element in the novel electrical distribution system disclosed and claimed herein.

An elongate generally channel-shaped or U-shaped insulating sheath 26 is inserted interior of the channel 2 and extends substantially along the entire length of the channel. The sheath is a thin sheet of electrical insulating material which may, for example, be extruded from a suitable plastic such as poly-vinyl chloride. The upper wall 28 of the sheath abuts the base 14 of the metal channel and opposite side walls or webs 30 of the sheath extend along the sides 16 of the metal channel. The lower edge 32 of each sheath side web is received in the gutter 22 and supported on the lip 20 to hold the sheath in place, as the sheath is not otherwise attached to the metal channel. The sheath side webs 30 each include an upper portion and a lower portion separated by an inwardly extending elongate ridge or shoulder 34.

Figure 7:
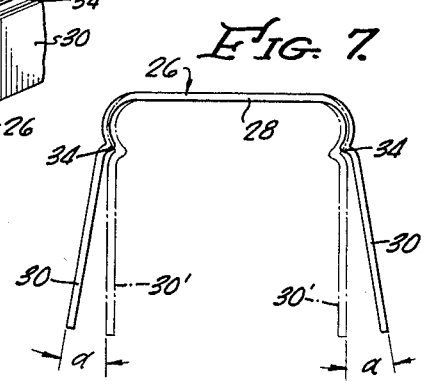
FIG. 7 is a cross-section through the sheath illustrating the flexure of the sheath from the uninstalled to the installed portions.

Referring to FIG. 7, the sheath is fabricated with its webs 30 each diverging from the vertical by an angle α which is on the order of about 5 to 10 degrees. The thermoplastic sheath is sufficiently resilient that the webs 30 can be bent toward each other to assume the vertical position 30' when the sheath is interior of the channel. Thus, when the sheath is in the channel, the sheath walls 30 are biased outwardly in tight engagement with the channel walls 16 so that the sheath does not substantially reduce the available space interior of the channel.

Referring to FIGS. 1–3, electrical power is supplied to each fixture 8 from a cable 40 within the channel 2 through a power feed cord 42 and a conventional junction box 44. The power supply cable 40 which is flat and generally rectangular in cross-section, is housed within the metal channel 2 with its upper or rear face 46 abutting the upper wall 28 of the sheath and its lower or front face 48 facing the longitudinal slot 24. The edges 50 of the cable are curved to conform to the curved shape of the upper wall portion of the sheath so as to fix the cable against lateral movement relative to the channel and sheath. The shoulders 34 of the sheath engage the front face of the cable 40 to retain the cable against the upper wall of the sheath and spaced from the exposed metal lips 20 of the channel.

The power cable 40 includes three current-carrying or hot stranded metal conductors 52 and one grounded stranded metal conductor 54 embedded in spaced-apart relation within a body of electrical insulating material 56. The conductors 52 and 54 are spaced across the width of the cable, and have their central axes 58 in a common plane parallel to the faces 46 and 48. The cable may be formed, for example, by extruding a thermoplastic insulating material such as polyvinylchloride directly onto the stranded conductors 52 and 54.

The plug 60 which is removably connected to the stranded conductors 52 and 54 to tap power from them (see FIGS. 2 and 3), includes an enlarged rectangular head 61 with four laterally spaced sets of conductive prongs 62 extending from its face 63; each set of two prongs being adapted to contact a separate stranded conductor 52 or 54. The prongs 62 each have a sharp point 64 to pierce the insulation 56 and contact the stranded conductors 52 and 54. The two prongs of each set are interconnected by a metallic base terminal 65 which is connected to a respective one of the wires 66 which lead out of the plug 60 to provide power for the lighting fixture, outlet, or other electrical device.

An elongate groove 68 formed by a recessed portion 69 in the front face of the cable between the grounded conductor 54 and the closest hot conductor 52 is adapted to receive a complementary tongue 70 extending from the upper face of the plug 60. The tongue and groove are located off center with respect to the width of the cable to assist in orienting the plug relative to the cable to assure that the prongs 62 contact the proper conductors. Moreover, the tongue 70 is higher than the sharp points 64 of the prongs to reduce the likelihood of snagging the points on the cable insulation 56 as the plug is being moved to the properly oriented position. Thus, the groove 68 extends above the major portion of the stranded conductors 52 and 54 to accommodate the high tongue. In some instances, the face 63 of the plug also has small ridges between adjacent sets of prongs which extend into the shallow grooves 72 in the lower face of the cable.

The mating tongue and groove lengthen the surface and air leakage paths between the grounded conductor 54 and the hot conductors 52, and the sheath 26 substantially increases both the surface and air leakage paths between the conductors and the metal channel 2, the nearest exposed portion of the metal channel being the lips 20.

Figure 6:
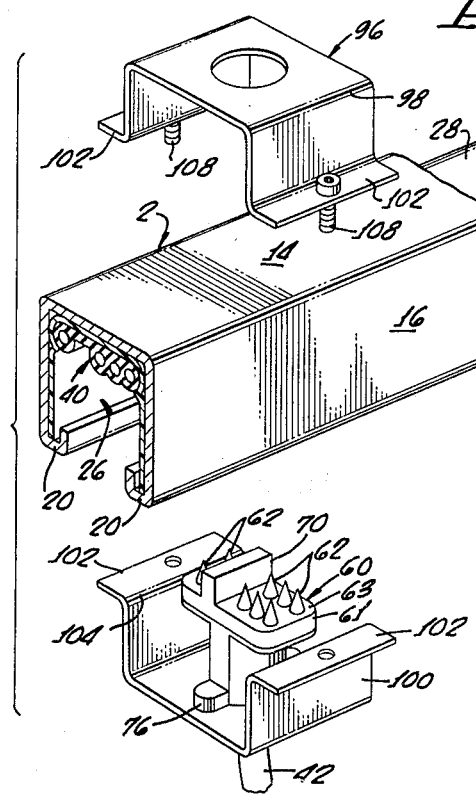
FIG. 6 is a partially exploded perspective view of a portion of the electrical distribution system.

Referring to FIGS. 4–6 as well as FIG. 3, a pair of arms 76 extend outwardly on opposite sides of the lower end of the plug 60 to form shoulders 78 facing away from the upper face 63.

A clamp 96 which holds the plug 60 in connection with the cable is shown most clearly in FIGS. 2 and 6. Upper and lower U-shaped brackets 98 and 100, each having outwardly extending flanges 102 along their edges 104, are adapted to be connected with their edges 104 mating to surround the channel 2. Each flange 102 includes an opening for receiving a connecting bolt 108 which threads into a nut 110 spotwelded onto each flange 102 of the lower bracket 100.

An aperture 112 through the lower bracket loosely receives the plug. The interior surface 114 of the lower bracket 100 adjacent the aperture 112 bears on the shoulder 78 of the plug to clamp the plug in the cable. The upper bracket 98 includes a similar aperture 112 so that the two brackets may be made from identical stampings, and further because it is sometimes desirable to reverse the brackets so that the bolts 108 may be threaded into the nuts 110 from below.

To install the system, the channels 2 are joined end-to-end and suspended overhead in the conventional manner illustrated in FIG. 1. The sheath which is sufficiently resilient that it can be deformed to pass through the slot 24, is then inserted into the channel in long lengths. Next, the cable 40 is uncoiled and inserted interior of the sheath 26 in lengths which may be continuous for each straight run of channel as the cable does not require a connection at each joint of the channel. The cable is inserted through the slot 24 edgewise and then is snapped into position above the shoulders 32 by applying pressure to deform both the cable and the sheath slightly.

The plug 60 is inserted through the slot with the wide dimension of its rectangular head 61 parallel to the channel sides 16 (see FIG. 4), and is then rotated 90° about its axis to the position shown in FIG. 5 so that it may be inserted into the cable. For this reason, the diagonal dimension $d$ of the plug head is slightly less than the interior width between the sheath walls 30.

Next, the upper and lower brackets 98 and 100 of the clamp are connected around the channel with the lower bracket 100 bearing upward on the plug shoulders 78 as shown in FIGS. 3 and 6. As the bolts 108 are threaded into the nuts 110, the lower bracket acts on the shoulders 78 to force the prongs 64 through the insulation 56 and into the conductors 52 and 54. The bracket 96 is so dimensioned that the flanges 102 meet when the prongs have penetrated the stranded conductors the desired distance to avoid any danger of tightening the bolts 108 too far and damaging the cable or the plug.

In order to relocate the plug at a different position along the cable, the clamp bolts 108 are unscrewed and the plug is pulled out of the cable and reconnected at the desired position. The holes made in the cable insulation by the prongs are quite small and are practically filled in by the resilient insulation 56 when the prongs are removed so that they need not be taped or covered in any other manner. In any event, the sheath 26 adequately insulates the channel 2 from the conductors.

Figure 8:
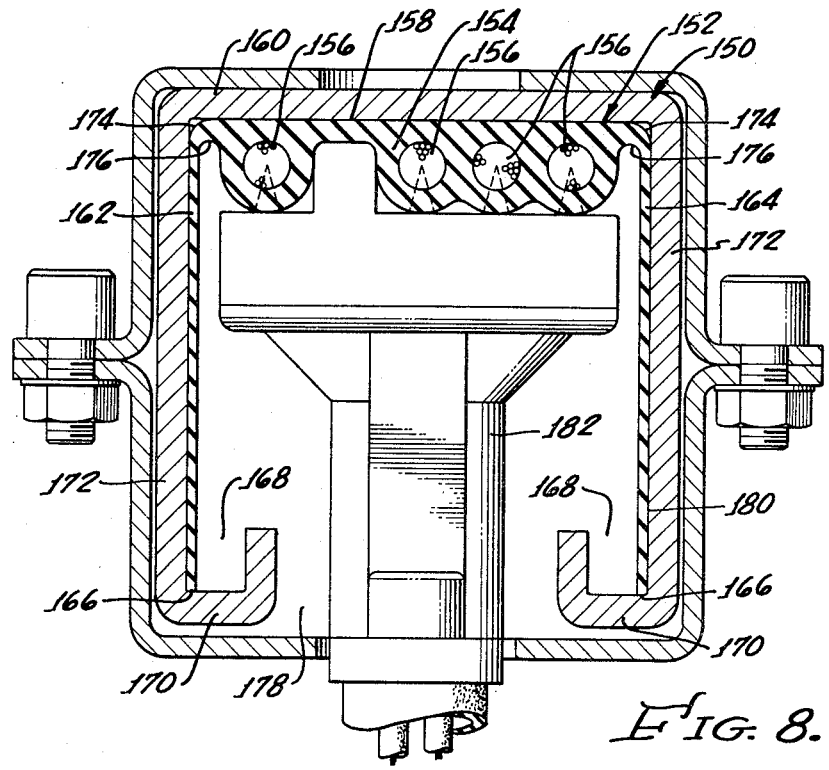
FIG. 8 is a cross-sectional view similar to that of FIG. 2, but illustrating a modified embodiment of the invention.
Figure 9:
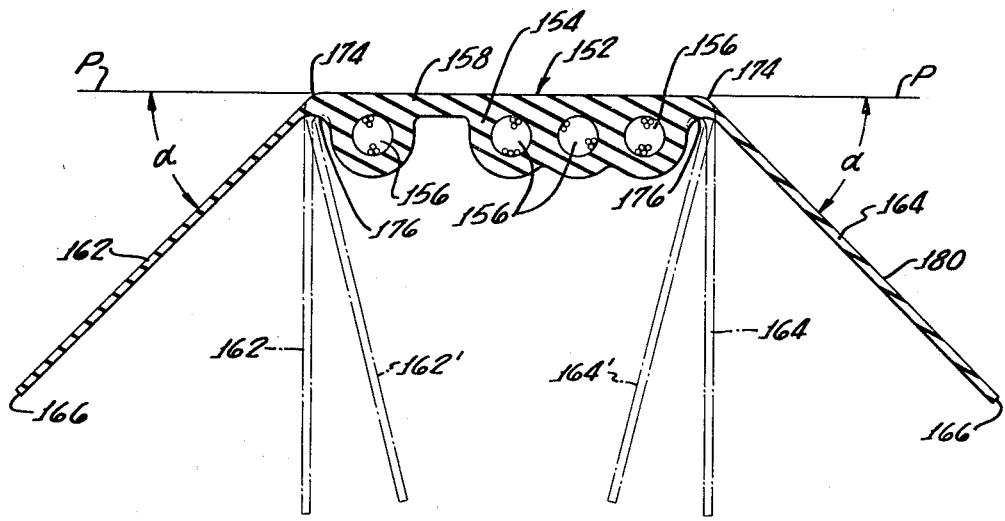
FIG. 9 is a cross-sectional view through the electrical cable of the embodiment illustrated in FIG. 8 illustrating the shape of the cable and flaps before insertion into the channel; and, FIG. 10 is a sectional view through a portion of a coil of the electrical cable of the embodiment illustrated in FIG. 8.
Figure 10:
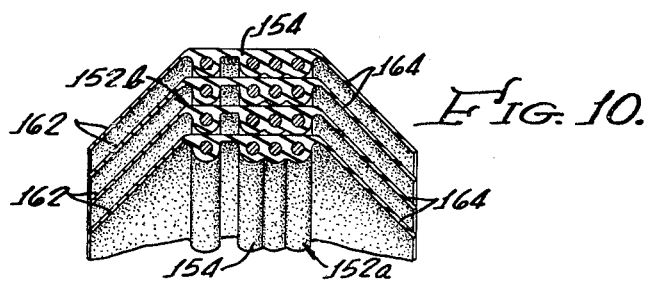

In the modified embodiment of the invention illustrated in FIGS. 8-10, the structural channel 150 is of the same cross-sectional configuration as described above. The power supply cable 152 includes an upper or main body portion 154 of insulating material which is flat and generally rectangular in cross-section and in which the conductors 156 are embedded. The upper or rear face 158 of the cable body portion directly abuts the base 160 of the metal channel with no intervening sheath. An elongate relatively thin flap or web 162 and 164 of insulating material which is integral with the cable body 154 extends downwardly from each edge of the cable body and is continuous all along the length of the cable. The lower edge 166 of each of the webs is received in the gutter 168 of the channel and supported on the channel lip 170. The insulated webs 162 and 164 serve the dual functions of retaining the cable body and conductors in the desired position and shielding the side walls 172 of the channel from the conductors.

Referring now to FIGS. 9 and 10, before the cable is inserted into the channel, the insulated webs 162 and 164 assume a downwardly and outwardly diverging position intersecting the plane P of the rear face 158 of the cable body at an angle $\alpha$ preferably no greater than about 45°. This permits ready coiling of the cable as illustrated in FIG. 10 with each cable coil, e.g. 152$a$, nesting inside the next 152$b$ without interference. On the other hand, the angle $\alpha$ is preferably not less than about 30° so that each web is readily flexed toward each other along a crease line 174. A portion 176 of each edge of the cable body adjacent the crease line 174 is recessed to facilitate the flexing. Moreover, in the illustrated embodiment, the recess 176 is rounded to reduce the likelihood of cracking or tearing the insulative material.

As the insulative material is a flexible plastic, such as polyvinylchloride, it may be payed off or uncoiled from the coils in which it is shipped and stored, and inserted interior of the installed structural channel in a continuous length for each straight run, thereby making the length of the cable independent of the length of the individual structural steel channels. To insert the cable through the longitudinal slot, one or both of the webs 162 and 164 is flexed toward the other, e.g. to the phantom position 162' and 164' shown in FIG. 9, and the cable is canted and slid obliquely through the channel slot 178; the overflexing of the webs being facilitated by the recessing of the rectangular body portion adjacent the fold line or crease line. The cable then is snapped into the position illustrated in FIG. 8 by flexing the webs. As the exterior surface 180 of the webs is continuous with the rear face 158 of the cable body and because the webs are biased outwardly, tight contact between the webs and the channel walls is assured so as to not interfere with insertion of the plug 188 to tap power from the conductors 156.

The structure and installation of the embodiment of FIGS. 8-10 is similar to that illustrated in FIGS. 1-7 except as is apparent from the above description and the accompanying drawings.

The above-described embodiments are intended to be illustrative only.

We claim:
1. In an electrical distribution system including an elongate metal channel member having a base and opposite side walls which extend downwardly from the base and terminate in inturned lips to define an open longitudinal slot opposite the base, the depth of the channel walls being at least approximately equal to the width of the base, the improvement comprising:
   an elongate body of insulating material removably inserted interior of the metal channel and having an upper face abutting the base of the metal channel and a lower face extending across the channel slot and spaced thereabove to permit an enlarged plug to be inserted upwardly through the slot into the channel, rotated 90° in the channel, and then moved upwardly further so that its prongs penetrate the insulation material;
   a pair of thin webs of insulating material removably inserted interior of the channel, with the webs engaging and covering the interior side walls of the metal channel substantially along their entire depth, the lower edge of each web abutting a respective inturned lip of the metal channel to retain the body of insulating material in position, the depth of the webs being approximately equal to the width of said body of insulating material; and,
   a plurality of elongate conductors held in spaced-apart relationship by said body of insulating material to be engaged by the plug prongs.
2. An electrical distribution system in accordance with claim 1, wherein the webs are integral with the body of insulating material and extend outwardly therefrom in diverging relationship when the insulating material is outside the channel, the insulating material being resilient so as to be readily deformable for insertion through the channel slots.

3. In an electrical distribution system including a plurality of elongate metal channel members joined end-to-end, each channel member having a flat base, opposite flat sides extending downward from the base and a lip extending inwardly and then upwardly from the bottom edge of each side to define an internal gutter along the bottom edge of each side and an open longitudinal slot opposite the base, a conductor assembly comprising:

an elongate cable body of electrical insulating material of a length independent of the length of the individual channel members inserted interior of the channels, said cable having an upper face abutting the channel base, and a lower face spaced above the channel lips;

a plurality of parallel conductors held by the cable body at positions spaced laterally across its width; and, a pair of elongate webs of insulating material disposed against the opposite side walls of the metal channel and extending from the edges of the cable body into the channel gutter to support the cable body against the channel base and to shield the channel sides from the conductors substantially all along their common length, said webs being interconnected and constructed to permit ready flexing towards each other for insertion through the channel slot.

4. An electrical distribution system in accordance with claim 3, wherein the webs are integrally connected to the cable body and normally extend outwardly in the downward direction so as to be biased against the sides of the channel.

5. An electrical distribution system in accordance with claim 3, wherein:

the webs are interconnected by an upper thin sheet of insulating material extending between the upper face of the cable body and the base of the metal channel to form a sheath separable from the cable body;

the webs normally extend outwardly when the sheath is exterior of the channel so as to be resiliently deformed against the sides of the channel when the sheath is inserted interior thereof; and, the webs include opposed elongate shoulders engaging the front face of the cable body to support it, the shoulders terminating laterally outward of the conductors to leave the conductors accessible through the channel slot.

6. An electrical cable adapted to be coiled for storage and uncoiled for insertion into an elongate metal channel suspended overhead comprising:

an elongate cable body of insulating material;

an elongate supporting flap of electrical insulating material extending outwardly from each of the longitudinal edges of the elongate cable body, the flaps assuming a diverging relationship in the coil and being constructed to be readily flexible to a generally parallel relationship for supporting the cable body interior of a metal channel;

each flap folding relative to the cable body portion generally along a longitudinal crease line;

the cable body portion having a longitudinal recess on each edge adjacent the crease line; and a plurality of elongate electrical conductors held in laterally spaced relationship by said insulating material.

7. An electrical distribution system comprising:

a plurality of elongate metal channel members joined end-to-end and suspended overhead to support electrical fixtures and provide a raceway for electrical cable, each channel member having a flat base, opposite flat sides extending downward from the base and a lip extending inwardly and then upwardly from the bottom of each side to define an interior gutter along the lower edge of each side and an open longitudinal slot opposite the base;

a thin sheet of electrical insulating material forming a separable elongate sheath member of U-shaped cross sectional configuration inserted interior of the channel, the sheath including a flat upper wall abutting the channel base and opposite side webs extending downward from the upper wall, each side web terminating in a lower edge which is received in the channel gutter to support the sheath on the channel lip, each sheath side web being bowed outwardly when exterior of the channel so as to be resiliently deformed by the channel sides when inserted interior of the channel to tightly abut the channel sides;

a portion of each sheath side web extending inwardly to form a shoulder disposed intermediate the upper wall and the lower edge and extending substantially continuously along its length;

an electrical cable of a length independent of the length of the individual channel members inserted interior of the sheath above the shoulders, the cable being formed of a substantially solid flexible body of electrical insulating material which has front and rear faces and side edges and which contains a plurality of parallel conductors embedded in it at positions spaced laterally across its width and disposed intermediate the faces of the cable with the longitudinal axes of the conductors in a plane parallel to the channel base, the side edges and rear face of the cable conforming to the space defined interior of the sheath above the shoulders so that the cable is snugly retained in position with its upper face abutting the upper wall of the sheath, its edges abutting the webs of the sheath and its lower face supported on the shoulders and spaced from the channel lips, the lower face of the cable having a recessed portion above the conductors defining an off-center longitudinal groove extending along the length of the lower face; and, a power plug having a head with sharp metal prongs extending from its upper face at a spacing corresponding to the lateral spacing of the conductors in the cable for piercing the cable insulation and contacting the conductors, the upper face of the head mating with the lower face of the cable and including a tongue of insulating material extending beyond the points of the metal prongs and positioned for insertion in the cable groove when the prongs are aligned with the cable conductors, the head of the plug being narrower than the channel slot in one lateral dimension, wider than the channel slot in the transverse lateral dimension, and slightly narrower than the interior width of the sheath in its wides diagonal lateral dimension so that the power plug may be inserted into said slot, and then rotated ninety degrees so that the wide dimension extends across the width of the cable body and the prongs align with the conductors.

8. An electrical distribution system comprising:

a plurality of elongate metal channel members joined end-to-end and suspended overhead to support electrical fixtures and provide a raceway for electrical cable, each channel member having a flat base, opposite flat sides extending downward from the base and a lip extending inwardly and then upwardly from the bottom of each side to define an interior gutter along the lower edge of each side and an open longitudinal slot opposite the base;

an electrical cable body of a length independent of the length of the individual channel members inserted interior of the channel members, the cable body being formed of a substantially solid flexible body of electrical insulating material which has front and rear faces and side edges;

a side flap of insulating material extending downwardly from each side of the cable body against the interior side walls of the channel members, the lower edge of each side flap being engaged in a respective one of the interior gutters to position the cable body with its rear face abutting the base of the channel members, the outer surface of the flaps and the rear face of the cable being continuous and each flap being biased outwardly against the adjacent channel side wall;

a plurality of parallel conductors embedded in the cable body at positions spaced laterally across its width and disposed intermediate the faces of the cable body with the longitudinal axes of the conductors in a plane parallel to the channel base;

a longitudinal cylindrical recess defined in each side of the cable body immediately beneath the upper edge of the flap and a recess defined in the lower face of the cable body extending above the conductors to define an off-center longitudinal groove; and, a power plug having a head with sharp metal prongs extending from its upper face at a spacing corresponding to the lateral spacing of the conductors in the cable for piercing the cable insulation and contacting the conductors, the upper face of the head mating with the lower face of the cable and including a tongue of insulating material extending beyond the points of the metal prongs and positioned for insertion in the cable groove when the prongs are aligned with the cable conductors, the head of the plug being narrower than the channel slot in one lateral dimension, wider than the channel slot in the transverse lateral dimension, and slightly narrower than the interior width of the sheath in its widest diagonal lateral dimension so that the power plug may be inserted into said slot, and then rotated ninety degrees so that the wide dimension extends across the width of the cable body and the prongs align with the conductors.

9. In an electrical distribution system including an elongate metal channel member having a base and opposite side walls which extend downwardly from the base and terminate in inturned lips to define an open longitudinal slot opposite the base, the depth of the channel walls being at least approximately equal to the width of the base, the improvement comprising:

an elongate channel shaped sheath member of electrical insulation material inserted in the interior of the channel member having a base engaging the base of the channel member and having a pair of webs covering the internal side walls of the metal channel member substantially along their entire length, the lower edge of each web abutting a respective inturned lip of the metal channel;

an elongate electrical cable member inserted interior of the sheath and having an upper face abutting the base of the sheath and a lower face extending across the channel slot and spaced thereabove, the cable including a plurality of elongated conductors spaced laterally across the cable; and said sheath includes means thereon retaining the electical cable against the base of the sheath.

References Cited

UNITED STATES PATENTS

| 1,965,181 | 7/1934 | Gerlach et al. | 339—185 |
| 3,144,505 | 8/1964 | Fork | 174—70 |
| 3,246,074 | 4/1966 | Neumann et al. | 174—48 |
| 3,248,576 | 4/1966 | Russell | 307—147 |
| 3,273,103 | 9/1966 | Ericson. | |

FOREIGN PATENTS

| 1,261,306 | 4/1961 | France. |
| 1,023,038 | 3/1966 | Great Britain. |

MARVIN A. CHAMPION, Primary Examiner

J. H. McGLYNN, Assistant Examiner

U.S. Cl. X.R.

174—99; 191—23; 339—99, 185